US011488107B2

(12) United States Patent
Toldo et al.

(10) Patent No.: US 11,488,107 B2
(45) Date of Patent: Nov. 1, 2022

(54) PREDICTING MISSING ITEMS

(71) Applicant: SAP SE, Walldorf (DE)

(72) Inventors: Luca Toldo, Hemsbach (DE); Konrad Schenk, Potsdam (DE); Tunahan Atilgan, Wiesloch (DE); Martin Hoecker, Heidelberg (DE); Bettina Lieske, Malsch (DE); Ying Jiang, Berlin (DE)

(73) Assignee: SAP SE, Walldorf (DE)

( * ) Notice: Subject to any disclaimer, the term of this patent is extended or adjusted under 35 U.S.C. 154(b) by 131 days.

(21) Appl. No.: 16/708,000

(22) Filed: Dec. 9, 2019

(65) Prior Publication Data

US 2021/0174297 A1    Jun. 10, 2021

(51) Int. Cl.
| | |
|---|---|
| *G06Q 20/10* | (2012.01) |
| *G06Q 20/14* | (2012.01) |
| *G06N 20/00* | (2019.01) |
| *G06Q 10/08* | (2012.01) |
| *G06Q 30/06* | (2012.01) |
| *G06K 9/62* | (2022.01) |
| *G06N 3/04* | (2006.01) |
| *G06V 30/413* | (2022.01) |

(52) U.S. Cl.
CPC ....... *G06Q 10/0875* (2013.01); *G06K 9/6221* (2013.01); *G06N 3/0454* (2013.01); *G06N 20/00* (2019.01); *G06Q 20/102* (2013.01); *G06Q 30/0631* (2013.01); *G06V 30/413* (2022.01)

(58) Field of Classification Search
CPC ............ G06Q 10/0875; G06Q 20/102; G06Q 30/0631; G06K 9/6221; G06K 9/00456; G06N 3/0454; G06N 20/00
See application file for complete search history.

(56) References Cited

U.S. PATENT DOCUMENTS

| | | | |
|---|---|---|---|
| 2018/0165850 A1* | 6/2018 | Gupta | ..................... G06T 11/60 |
| 2021/0125720 A1* | 4/2021 | Cheng | .................... G16H 50/20 |

OTHER PUBLICATIONS

Americal Association of Professional Coders. (Aug. 5, 2019). https://www.aapc.com/discuss/threads/coder-productivity.2828/. Retrieved from Americal Association of Professional Coders: https://www.aapc.com/.
Brons, A. E. (2017). *Machine learning in healthcare invoicing systems*. Universiteit Utrecht, Artificial Intelligence. Utrecht: Universiteit Utrecht.

(Continued)

*Primary Examiner* — Peter Ludwig
*Assistant Examiner* — Reva R Moore
(74) *Attorney, Agent, or Firm* — Mintz Levin Cohn Ferris Glovsky and Popeo, P.C.

(57) ABSTRACT

In some embodiments, there is provided a system. The system may include at least one data processor and at least one memory storing instructions which, when executed by the at least one data processor, cause the apparatus to at least: determine, for a received document including at least one item, that the received document likely includes at least one missing item, the determination based on at least a machine learning model and the at least one item; and provide an indication of the at least one missing item. Related systems and articles of manufacture are also provided.

7 Claims, 13 Drawing Sheets

(56) References Cited

OTHER PUBLICATIONS

Chilingerian, J. (2008). Origins of DRGs in the United States: A technical, political and cultural story. In J. Kimberly, G. de Pouvourville, & T. d'Aunno, *The Globalization of managerial Innovation in Health Care*. Cambridge: Cambridge University Press.
Cram, P., et al., (2012). Total knee arthroplasty volume, utilization, and outcomes among Medicare beneficiaries, 1991-2010. *Journal of American Medical Association*, 1227-36.
KBV. (Jul. 1, 2019). Retrieved from https://www.kbv.de/html/online-ebm.php.
Merritt, A., et al., (Mar. 11, 2019). *PredictionIO*. Retrieved from https://predictionio.apache.org/.
Pohling, C. (2008). Bill by Time Spent on Case. *The Hospitalist*.
Predictionio. (Oct. 27, 2018). Retrieved from https://github.com/apache/predictionio/blob/master/LICENSE.txt.
Shimamoto, T. (May 31, 2019). *PredictionIO Similar Product Engine Template (Scala-based parallelized engine)*. Retrieved from https://github.com/apache/predictionio-template-similar-product.
Stephani, V., Crommelynck, A., Durant, G., Geissler, A., Van den Heede, K., Van de Voorde, C & Quentin, W. (2018). *Payment Methods for Hospital Stays With a Large Variability in the Care Process*. Federal Kenniscentrum voor de Gezondheidszorg.
World Health Organisation. (2010). *WHO-CHOICE estimates of cost for inpatient and outpatient health service delivery*. Retrieved from https://www.who.int/choice/cost-effectiveness/inputs/country_inpatient_outpatient_2010.pdf.

\* cited by examiner

PREDICTING MISSING ITEMS

TECHNICAL FIELD

The subject matter described herein relates generally to machine learning.

BACKGROUND

Health care systems are specific to each country and change rapidly to adapt to new needs and societal-specific structures. Daily hospital costs are very different from country to country. Hospital surgeries are a driver of U.S. healthcare spending inflation as well as for other countries. In some regions, hospital reimbursement models are changing from a lump payment to individual billing. Health care systems are faced with extreme pressure to reduce cost while providing the same if not higher quality of care.

SUMMARY

Systems, methods, and articles of manufacture, including computer program products, are provided for detecting and/or recommending missing items.

In some embodiments, there is provided a system. The system may include at least one data processor and at least one memory storing instructions which, when executed by the at least one data processor, cause the apparatus to at least: determine, for a received document including at least one item, that the received document likely includes at least one missing item, the determination based on at least a machine learning model and the at least one item; and provide an indication of the at least one missing item.

In some variations, one or more of the features disclosed herein including the following features can optionally be included in any feasible combination. The received document may include an invoice. The at least one item may include a hospital billing code. The machine-learning model may include a co-occurrence model. The co-occurrence model may include a matrix including a value representative of a likelihood that pairs of items are likely to be included in the received document, the pairs of items including the at least one item and the at least one missing item. The co-occurrence model may include a co-occurrence matrix including a value representative of a likelihood that pairs of items are likely to be included in the received document. In some implementations, the co-occurrence model advantageously provides missing items from invoices. A recommendation item corresponding to the at least one missing item may be provided (e.g., for display at a user interface). A value indicative of a confidence that the at least one missing item is missing from the received document may be provided (e.g., for display at a user interface). A value indicative of a confidence that the at least one missing item is missing from the received document may be provided (e.g., for display at a user interface). The machine-learning model may be trained based on at least a set of reference documents that include a set of verified items. The machine-learning model may be generated based on at least a statistical technique, a neural network, a pattern recognizer, a clustering algorithm, a rule-based engine, a priori information, a convolutional neural network, and/or a recurrent neural network.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a machine learning based plug-in for accessing a cloud-based analytics engine, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

As noted, health care systems face challenges with respect to providing services more efficiently. To that end, identifying unbilled line items in invoices may be a factor in enabling more efficient cost recovery by data processing systems associated with health care systems.

To illustrate further, a patient may receive care and that care may be invoiced and submitted electronically for payment. For example, the invoice may be for a given service, such as stich a patient's forearm. For that service, there may one or more items associated with the service. To illustrate using the stitches example, the invoice may include a code for the diagnosis (e.g., patient has forearm wound and needs stitches on forearm) and one or more codes for the items associated with the stitches. These items may be in the form of codes, such as hospital billing codes, although other types of codes, symbols, textual descriptions, or indicators may be used. In the stiches example, the items may include a first code for sewing up the wound, a second code for an antiseptic, a third code for an antibiotic, and a fourth code for gauze. In this example, the application of the stitch will likely be associated with a specific set, group of items, such as hospital billing codes. All too often, when a given patient undergoes a treatment, the invoice may not include all of the billing codes for the services rendered. As such, the health care system is not properly recovering costs, which may ultimately result in inefficiencies in the system that drive up the cost of healthcare. There is thus a need to provide better automated processing of documents, such as invoices, hospital invoices, and the like, to detect missing line items.

In some example embodiments, there is provided a system including machine-learning to detect one or more missing items in a document such as an invoice. In some example embodiments, the system may detect missing billing codes, such as hospital billing codes, from invoices such as hospital invoices.

Figure 1:
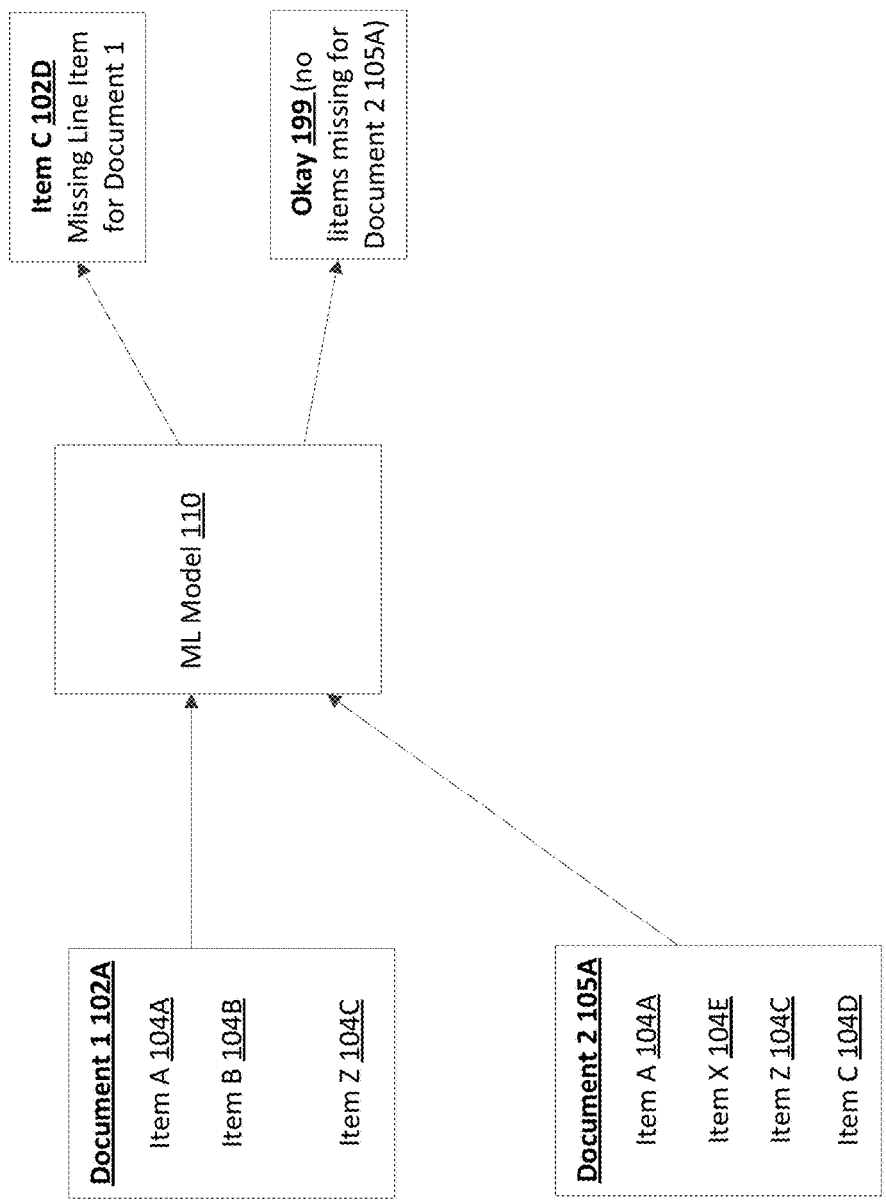
FIG. 1 depicts an example of a system, in accordance with some example embodiments.

FIG. 1 depicts an example of a system 100, in accordance with some example embodiments. The system 100 may include a machine-learning (ML) model 110, which has been trained to detect one or more missing items in a document such as an invoice. This trained ML model may receive a document, such as document 1 102A, and detect whether document 1 is missing one or more items. As used herein, the ML model refers to a model formed based on machine learning to detect one or more missing items and/or recommend a missing item. The ML model may be generated based on statistical techniques, neural networks, pattern recognizers, clustering algorithms, rule-based engines (based on a priori knowledge), convolutional neural networks, recurrent neural network, and/or a combination of one or more of these technologies.

For example, the document 1 102A may correspond to an invoice, such as a hospital invoice. This document 1 may include one or more items 104A, B, and Z. These items may represent codes, such as hospital billing codes. Referring to the previous example of stitching up a wound, the item A 104A may indicate sewing up the wound, item B 104B may indicate the antiseptic, and the item 104Z may indicate gauze. The ML model 110 may receive the document 1 including the items 104A, B, and Z and determine whether there are any missing items. In this example, the ML model may detect that item C 102D (which may indicate antibiotic) is missing from the document 102A. In this way, the error in the document 1 may be detected and/or flagged for further processing, such as adding the missing item 102C, auditing the document 102A, and the like.

Although some of the examples refer to the documents, such as document 102A, the documents may represent an invoice or a portion of an invoice. Moreover, the document may be structured in other forms such as an entry in a database. For example, the document including the items may be instantiated as a row or a column of a database management system, and the document may be provided as an input to the ML model 110.

The ML model 110 may be trained to detect whether there are any missing items. In some example embodiments, the ML model 110 may comprise a co-occurrence model. This co-occurrence model may be trained to learn the likelihood that a group (or set, for example) of items are likely to found together. In other words, the co-occurrence model is trained to determine whether, given a first item, a second item is likely to be present in a group of items. The ML model and/or the co-occurrence model may be generated based on a prior information, statistical, and/or rules. In the example of FIG. 1, the ML model 110 may detect that, given items 104A, 104B, and/or 104C, the item C 102D (which may indicate the antibiotic) is missing from document 102A. In this way, the ML model may detect the error in document 1 102A and may flag document 1 for further processing, such as adding the missing item 102C and the like.

The example shown at FIG. 1 also depicts document 2 105A having items 104A, 104E, 104C, and 104D. This document 2 may be received by the ML model 110. But in this example, the ML model determines that there are no missing items in document 2 105A, so the ML model outputs an indication that there are no missing items (see, e.g., okay 199). In other words, the set of items 104A, 104E, 104C, and 104D is likely to be a complete set of items.

Given the complexity of hospital billing codes and the complexity of the combinations of allowable combinations of authorized billing codes, a human cannot reliably detect the missing items from the large quantity of hospital invoices, so the system 100 provides a novel way to process these electronic documents to detect missing items, such as billing codes.

Figure 2:
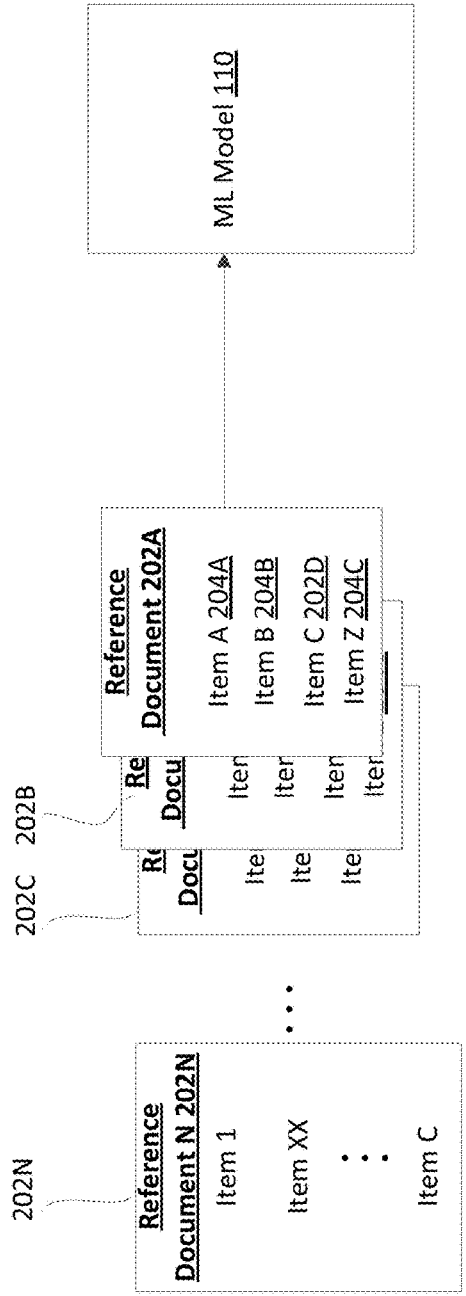
FIG. 2 depicts an example of the system of FIG. 1 during a training phase, in accordance with some example embodiments.

FIG. 2 depicts a training phase for the ML model 110, in accordance with some example embodiments. In the example of FIG. 2, the ML model 110 may be provided with a plurality of reference documents 202A-N. These reference documents may represent invoices confirmed or somehow checked to include a complete or proper set of items. For example, the reference document 202A may represent a reference invoice for the stiches procedure noted above, and this reference document 202A has been confirmed to include the complete set of line items 204A, B, D, and C. Each of the reference documents 202A-202N may also represent reference invoices for the same or a different procedure (or, e.g., service). Each of the reference documents 202A-202N may include a corresponding set of items that have been checked to confirm the grouped line items are likely a complete, proper group of line items.

To train the ML model 110, the reference documents 202A-N are provided to the ML model to enable the ML model to learn the co-occurrence grouping of items found on the reference documents. In the case of implementing the ML model as a co-occurrence model, the ML model may generate a matrix, such as a co-occurrence matrix. This matrix may indicate the likelihood that given a first item, a second item should be preset. This likelihood may be in terms of a score or percentage. The ML model may also be trained to learn clusters or groups of items. When this is the case, the ML training with the reference documents enables the ML model to form a cluster in n-dimensional space of the line items that are likely found together on a document such as an invoice. In other words, the training enables the ML model to determine the likelihood that a group of items should co-occur on the same invoice for a particular service, such as the stitch service associated with document 1 102A noted above. In this way, if a new document is received for processing after the training phase of the ML model, the trained ML model 110 may provide an indication of whether then new document is missing an item. The indication may be in the form of a likelihood that an item is missing from the document. Alternatively or additionally, the indication may include the identity of the missing line item (or candidate missing items) as well. For example, the indication may indicate an invoice is missing one or more hospital billing codes. Alternatively or additionally, the indication may state the identities of the missing items such as item C 102D as shown at FIG. 1.

Although the ML model 110 may be implemented as a co-occurrence model, the ML model may be implemented using other types of ML technologies, such as a convolutional neural network, recurrent neural network, and/or other type of ML technology. The following provides an example implementation of the ML model 110 as a co-occurrence model.

The ML model 110 may be implemented as a matrix. For example, the ML model (which detects and/or recommends a missing item) may be implemented in a matrix form. For each pairwise combination of items, the matrix may include a likelihood that the pair of items are likely to be found together in a given document. The matrix may comprise a square matrix and/or may be symmetric diagonal matrix. The following provides an example of how to generate the ML model's matrix, although the matrix form may be realized in other structures such as a table, vectors, and other ways to provide the noted ML model that detects and/or recommends missing items.

Figure 3:
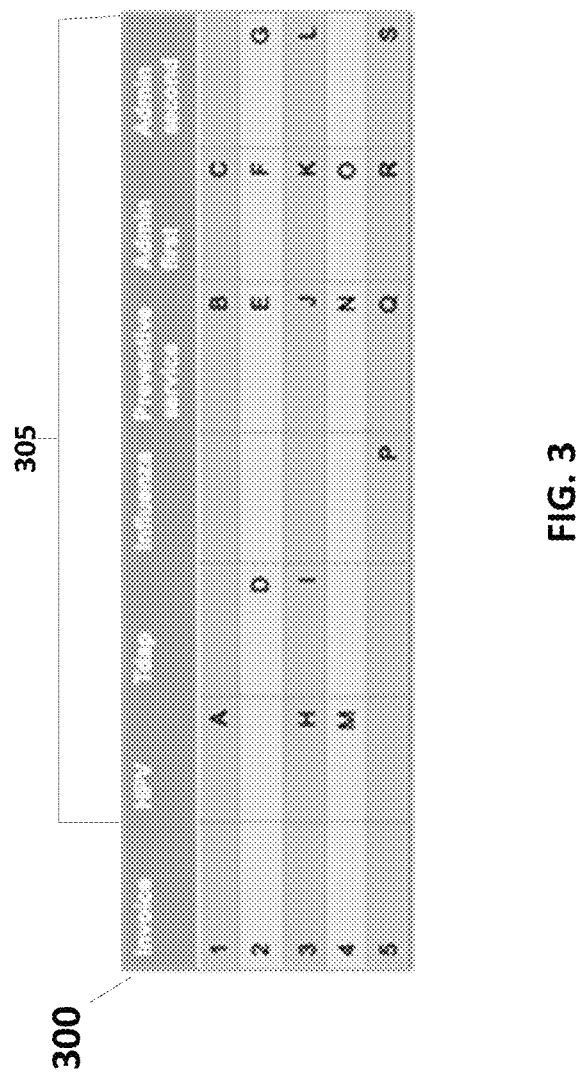
FIG. 3 depicts an example of an invoice-billing item table, in accordance with some example embodiments.

To generate the ML model's matrix, the reference documents (see, e.g., 202A-N) may be used. For example, the reference documents 202A-N may be processed into a matrix or table, an example of which is shown at FIG. 3. FIG. 3 depicts an example of the table 300, which in this example is referred to as the invoice-billing item table 300. This table includes the possible combinations of items, such as billing items, associated with each of the reference documents, such as reference invoices. And, table 300 illustrates an example including 5 reference documents, which are reference invoices 1-5 in this example.

To generate invoice-billing item table 300, the reference invoices (which are form the training set of invoices) may be processed to identify the allowed set of billing items in the reference invoices. In the example of FIG. 3, the set of allowed billing items 305 may be inserted into the header 305 of the table 300 as HPV, Tdap, Influenza, Preventive Service, Admin first, and Admin second. In some embodiments, the allowed billing items may be billing codes which are authorized for reimbursement, while items that are not allowed (e.g., not authorized for reimbursement) may be excluded from the list of allowed items and thus not listed at the header 305.

The invoice-billing item table 300 may be populated with the item data from each of the reference invoices. For the first reference invoice "1" for example, the first row of the table 300 may be populated with an indication for each of the billing codes found in the reference invoice 1, which in this example includes A (HPV), B (Preventive Service), and C (Admin first). Likewise, for the second reference invoice "2" for example, the second row of the table 300 may be populated with an indication for each of the billing codes found in the reference invoice 2, which in this example includes D (Tdap), E (Preventive Service), F (Admin First), and G (Admin Second), and so forth for each invoice and corresponding row of table 3. Although the indications in this example are represented by the values A, B, C, so forth, in some implementations, the value "1" is used to indicate the presence of the billing code, and a "0" is used to show it is not present. Referring again to the reference invoice 1, the row would be as follows: 1, 0, 0, 1, 1, and 0.

Figure 4A:
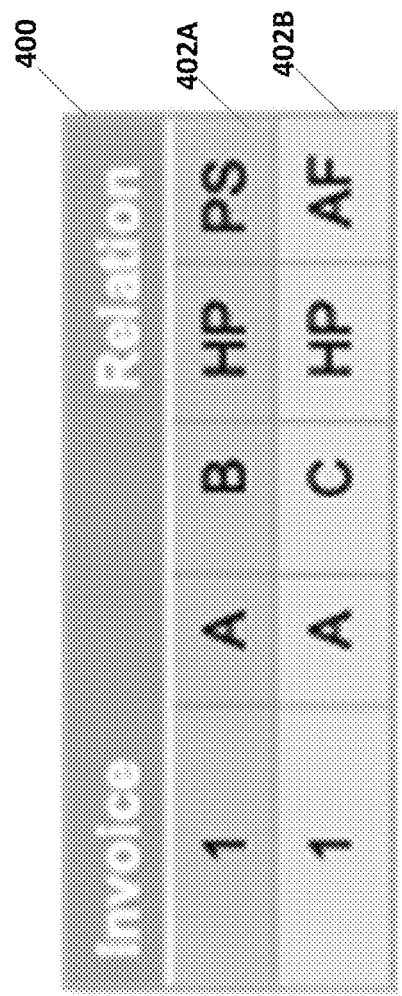
FIGS. 4A, B, and C depict examples of observed-relations tables, in accordance with some embodiments.
Figure 4B:
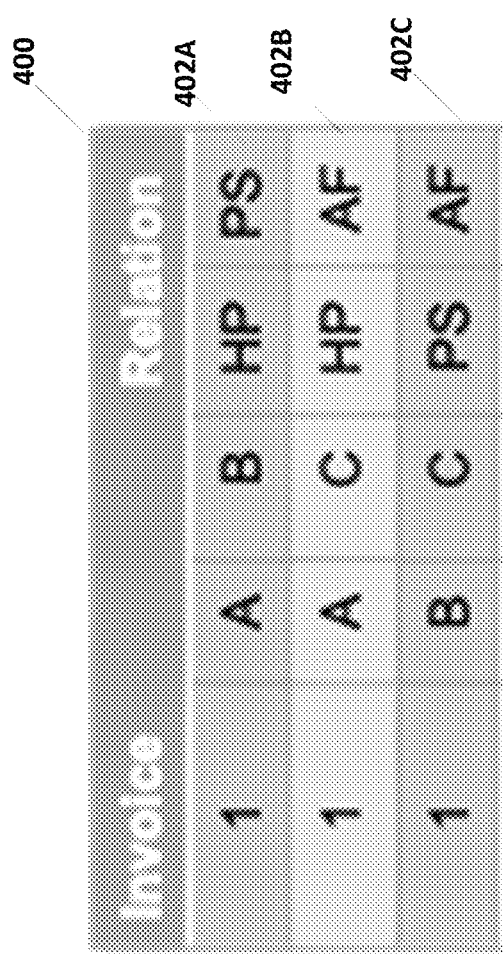
Figure 4C:
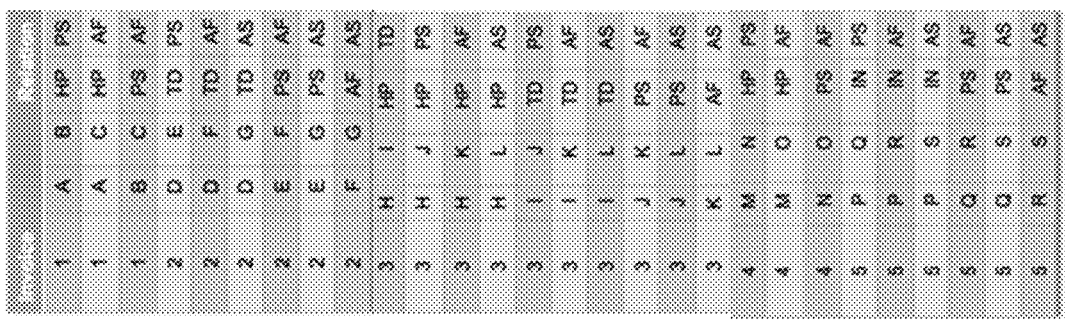

FIG. 4A depicts an example of an observed-relations table 400. The observed relations table 400 is derived from the invoice-billing item table 300. Specifically, the observed relations table 400 includes 5 columns and n rows, wherein n is the number of all observed item-item co-occurrences. For example, the item-item co-occurrence refers to the presence of a specific pair of billing items on the same reference invoice. To illustrate further with reference invoice 1 at FIG. 3, the HPV item co-occurs with Preventive Service item and Admin First item. In this example, the first pair A (for HPV) and B (for Preventive Service) is shown at 402A, while the second pair A (for HPV) and B (for Admin First) is shown at 402B. The co-occurrence between Preventive Service and Admin First is also added to table 400 at the third line 402C to complete the contribution of the reference invoice 1 to the observed relations table 400 shown at FIG. 4B. The remaining invoices may be processed and the observed relations may be added to the observed relations table 400 as shown at FIG. 4C. In the example of FIG. 4C, there are 28 relations observed from a dataset of 5 reference invoices.

Figure 5A:
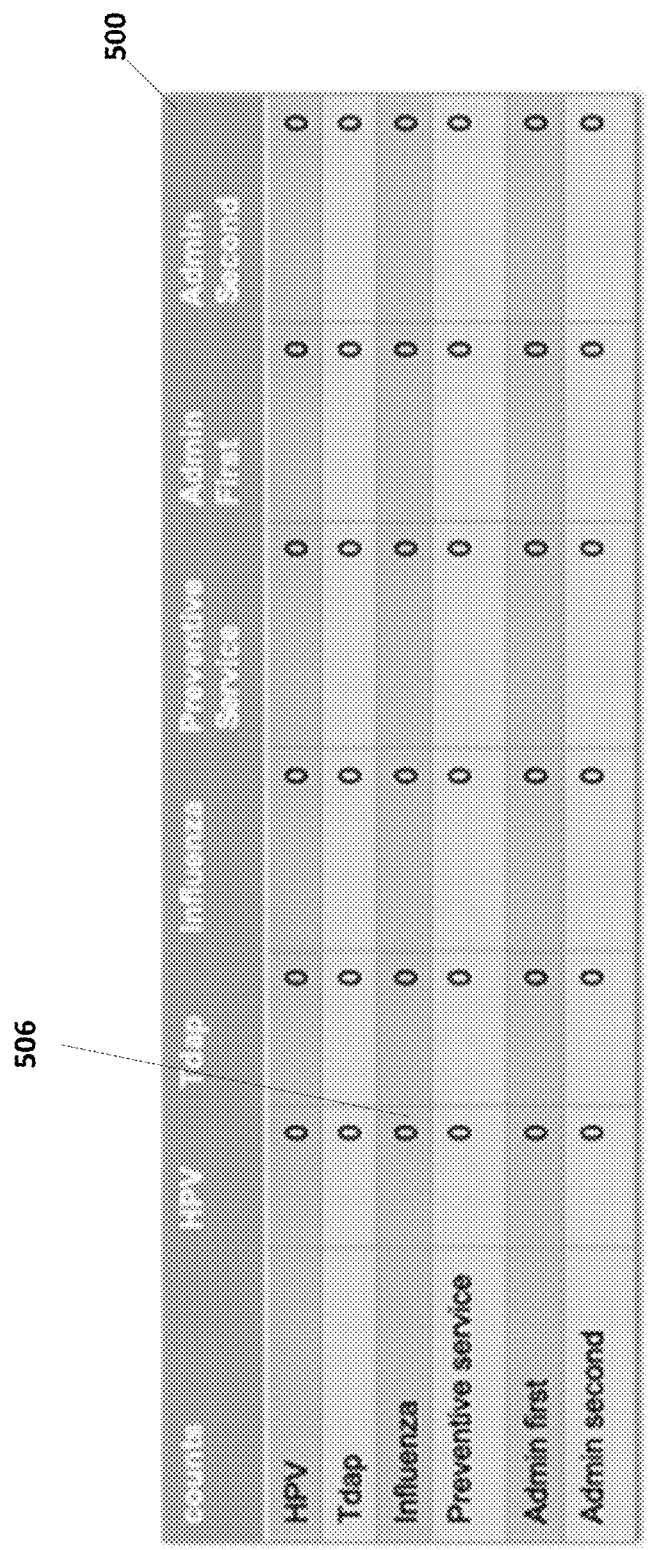
FIGS. 5A, B, C, and D depict an example of a ML model, in accordance with some embodiments.

As noted, the ML model 110 may be in the form of a squared, diagonally symmetrical matrix of billing items both on columns and on rows. FIG. 5A depicts an example this matrix 500, which may be initially generated to include rows and columns corresponding to the types of billing items (or codes). Referring to the example of FIG. 5A, the table 500 consists of a symmetric squared matrix having n columns and n rows, whereby n is the number of distinct types of billing items (in this example 6 items corresponding to HPV, Tdap, Influenza, Preventive Service, Admin first, and Admin second). FIG. 5A depicts the initialized count values set to zero, but the count values (at each cell) are updated from "0" to include the counts of co-occurrence between the pairs of billing items corresponding to the row and column. For example, the count value 506 may be updated to the quantity of occurrences of HPV and Influenza in each of the reference invoice documents.

Figure 5B:
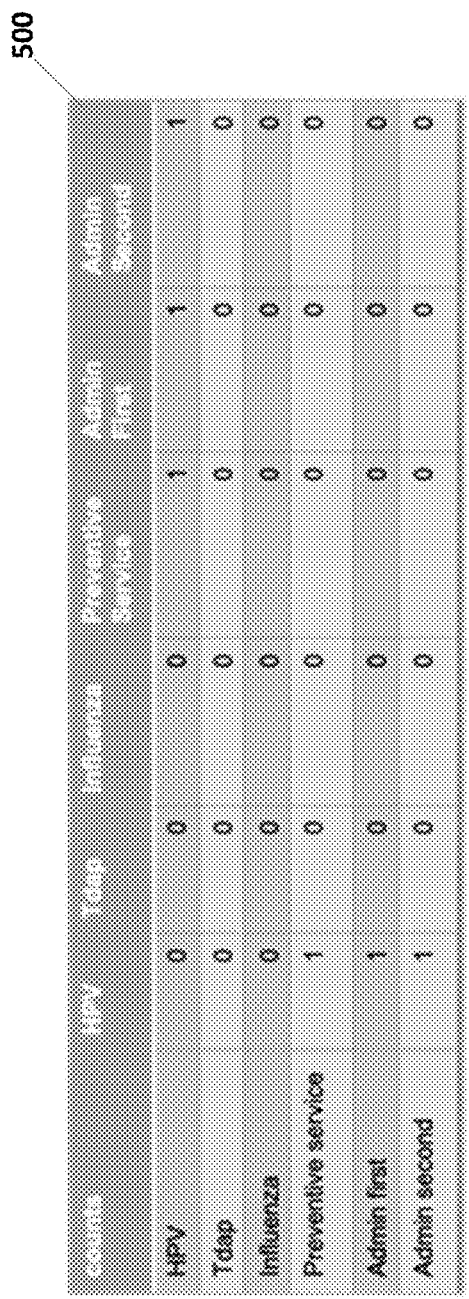
Figure 5C:
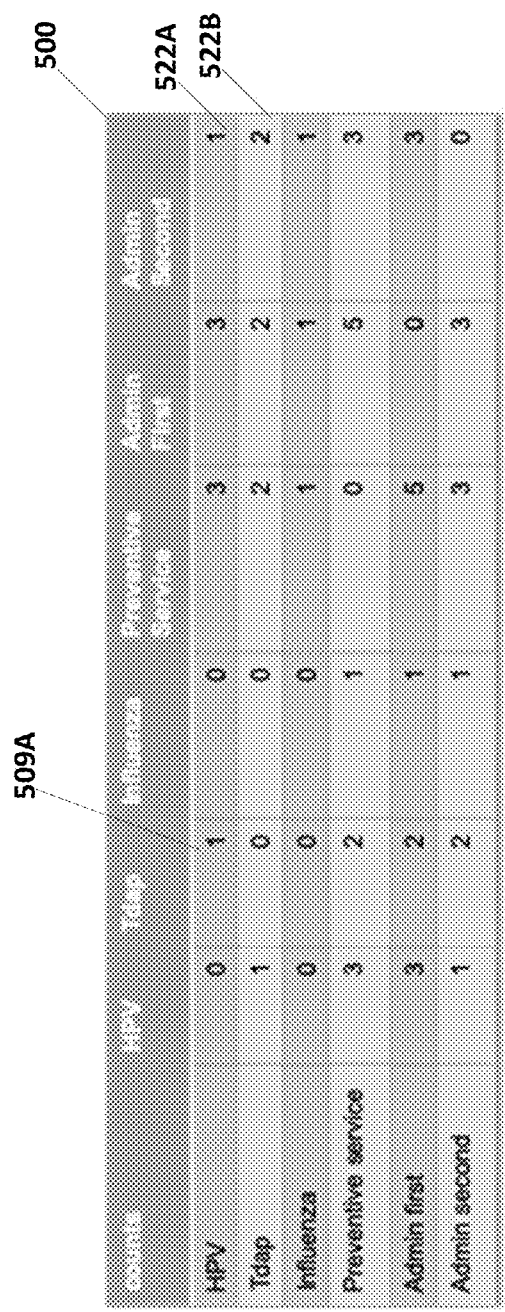

For each row of the observed relations table 400 (FIG. 4C), the corresponding cell of the matrix 500 is updated with the counts of co-occurrences for each of the pairs of items (e.g., the pair corresponding to the row and column). Referring to the previous example, the processing of the first 3 rows of the observed relations table 400 will result in the cell content shown in FIG. 5B. FIG. 5C depicts the count based processing of all of the rows of FIG. 4C. Based on FIG. 5C first row 522A, there is 0 co-occurrence of HPV and HPV in the reference invoices 1-5 (FIG. 4C), 1 co-occurrence of HPV and Tdap, 1 co-occurrence of HPV and Influenza, 3 co-occurrences of HPV and Preventive Service, 3 co-occurrences of HPV and Admin First, and 1 co-occurrences of HPV and Admin Second. And based on FIG. 5C second row 522B, there is 1 co-occurrence of Tdap and HPV, 2 co-occurrences of Tdap and Preventive Service, 2 co-occurrences of Tdap and Admin First, and 2 co-occurrences of Tdap and Admin Second, and so forth through the rows at table 500 at FIG. 5C.

Figure 5D:
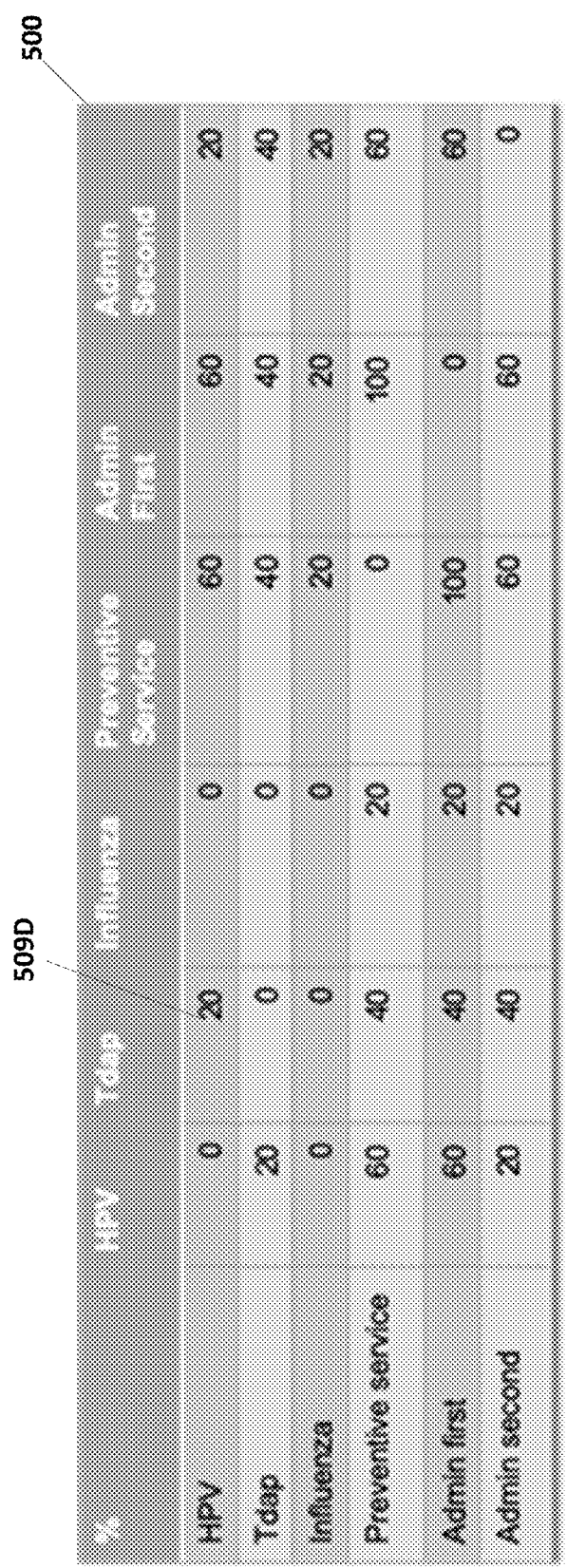

In some implementations, the matrix 500, the matrix may be normalized. For example, the count values may be normalized to a value between 0 and 1 or to a percentage. FIG. 5D depicts the matrix of FIG. 5C normalized into percentages. For example, the count in a given cell may be normalized by dividing the cell's count with the total number of invoices processed, and then multiplying with 100. In the current example with 5 invoices, each count is divided by 5, and then multiplied by 100. Referring to count 1 at 509A (FIG. 5C), it is normalized to 20 509B at FIG. 5D (e.g., 1 divided by 20 equals 0.20; 0.20 multiplied by 100). The matrix 500 at FIG. 5C may be considered a co-occurrence matrix.

The matrix 500 at FIG. 5C or 4D may be considered a co-occurrence matrix, which may be used as the ML model 110.

Figure 6:
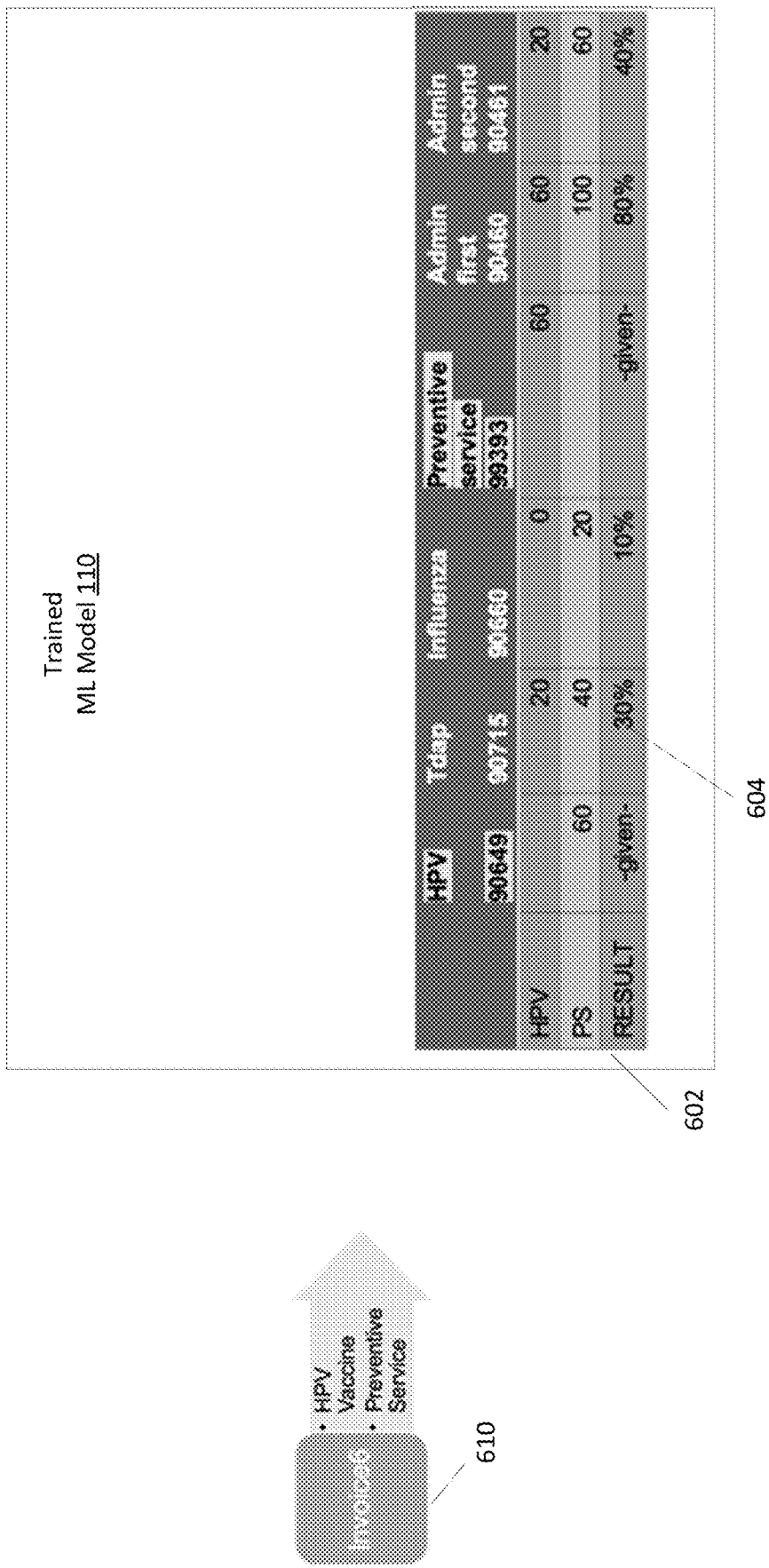
FIG. 6 depicts another example of a system, in accordance with some example embodiments.

FIG. 6 depicts the ML model 110 implemented to include the co-occurrence matrix noted above with respect to FIG. 5D. In the example of FIG. 6, the ML model 110 has been trained based on the reference invoices noted above. When a new invoice 610 is received by the ML model 110, the ML model is used to determine the likelihood (e.g., scores, strengths, confidence values) that other items should be present in invoice 610. To illustrate, invoice 610 includes HPV and Preventive Service. As such, there is 80% chance that given HPV and Preventive Service, Admin First should be included in the group as well. There is only a 30% chance that Tdap should be included in the grouping of items, a 10% likelihood that Influenza should be part of the grouping, and a 40% likelihood that Admin Second should be included in the grouping. In some embodiments, the items Tdap, Influenza, and Admin Second may be reported as possible missing items (along with their strengths or scores). In some embodiments, a threshold value may be used to determine whether to include the item. For example, the threshold may be set at 51%, in which case only the Preventive Service is included in the grouping the items.

Referring to FIG. 6 at row 602, HPV and Preventive Service are included in the received document 610, so there is no likelihood determination provided by the model 110 as shown by "given." But the likelihood that Tdap is present given HPV is 20% and the likelihood that Tdap is present given Preventive Service (PS) is 40% (see also contents of table 500 at FIG. 5D), so the ML model 110 may combine (e.g., average) this to provide a 30% likelihood 604 that Tdap is present given that HPV and PS are found in the received document. Likewise, the likelihood that Influenza is present given HPV is 0% and the likelihood that Influenza is present given PS is 20% (see also contents of table 500 at FIG. 5D), so the ML model 110 may combine this to provide a 10% likelihood that Influenza is present given that HPV and PS are found in the received document. And, the likelihood that Admin First is present given HPV is 60% and the likelihood that Admin First is present given PS is 100% (see also contents of table 500 at FIG. 5D), so the ML model 110 may combine this to provide a 80% likelihood that Admin First is present given that HPV and PS are found in the received document. Furthermore, the likelihood that Admin Second is present given HPV is 20% and the likelihood that Admin Second is present given PS is 60% (see also contents of table 500 at FIG. 5D), so the ML model 110 may combine this to provide a 40% likelihood that Admin Second is present given that HPV and PS are found in the received document. This example shows the pairwise likelihood between pairs of items included in the ML co-occurrence model 110.

Figure 7:
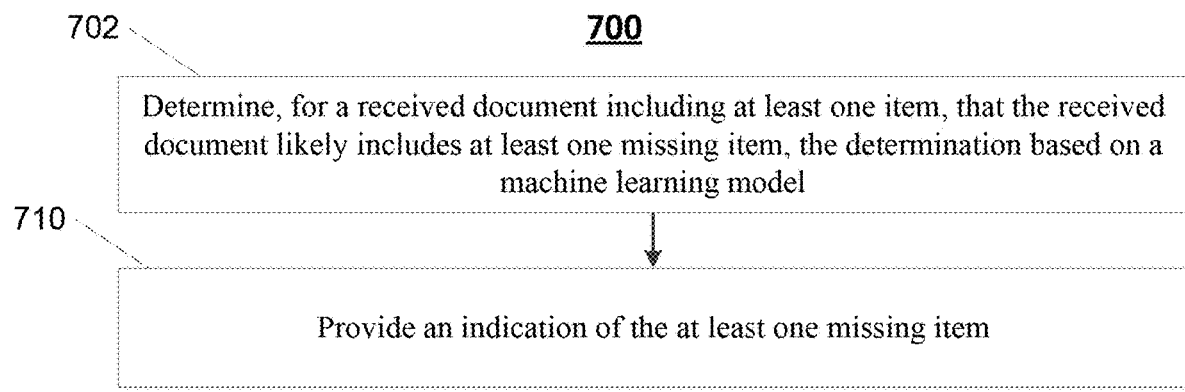
FIG. 7 depicts an example of a process for detecting missing items, in accordance with some embodiments.

FIG. 7 depicts an example of a process flow 700, in accordance with some example embodiments.

At 702, a determination may be made regarding whether a received document likely includes at least one missing item. Referring also to FIG. 6 for example, the ML model 110 may receive a document 610. The ML model 110 (which has been trained) may determine that the received document likely includes at least one missing item. For example, the ML model may determine that Admin First is likely missing, and this determination may be based on the item(s) included in the received document. As noted, the presence of HPV and Preventive Service billing codes in document 610 may provide a likelihood that Admin First is also missing. In this example, the likelihood is about 80% (or said a different way, there is an 80% confidence score or strength that the Admin First is missing from the received document 610.

At 710, an indication may be provided of the at least one missing item. Referring also to FIG. 6 for example, the ML model 110 may provide an indication that the Admin First is missing from the received document 610. This indication may be an indication that something is missing from document 610, a recommended item for the missing item (e.g., identity of the Admin First billing code), and/or a likelihood (strength, score, or confidence value 80%) regarding the missing item. The indication may be provided to a user interface or other processor to flag the received document for further processing, such as correction (adding the missing item), auditing, etc.

Figure 8:
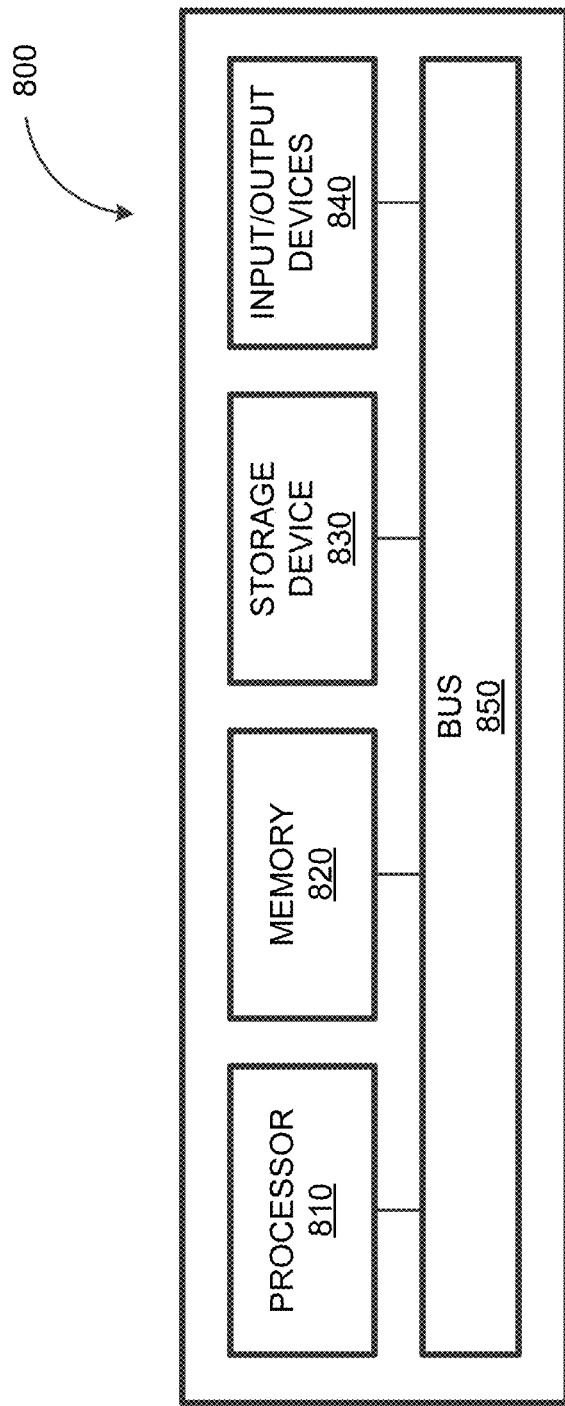
FIG. 8 depicts a block diagram illustrating a computing system, in accordance with some example embodiments.

FIG. 8 depicts an example of a system 800 consistent with implementations of the current subject matter. The computing system 800 can be used to implement the user equipment or one or more of the components therein such as the screen share service 405, a screenshot engine configured to take screenshots of the display of the user equipment, and/or other components disclosed herein. As shown in FIG. 8, the computing system 800 can include a processor 810, a memory 820, a storage device 830, and input/output device 840. The processor 810, the memory 820, the storage device 830, and the input/output device 840 can be interconnected via a system bus 850. The processor 810 is capable of processing instructions for execution within the computing system 800. Such executed instructions can implement one or more components of, for example, the screen share service 405. In some example embodiments, the processor 810 can be a single-threaded processor. Alternately, the processor 810 can be a multi-threaded processor. The processor 810 is capable of processing instructions stored in the memory 820 and/or on the storage device 830 to display graphical information for a user interface provided via the input/output device 840.

The memory 820 is a computer readable medium such as volatile or non-volatile that stores information within the computing system 800. The memory 820 can store data structures representing configuration object databases, for example. The storage device 830 is capable of providing persistent storage for the computing system 800. The storage device 830 can be a floppy disk device, a hard disk device, an optical disk device, a tape device, a solid-state device, and/or any other suitable persistent storage mechanisms. The input/output device 840 provides input/output operations for the computing system 800. In some example embodiments, the input/output device 840 includes a keyboard and/or pointing device. In various implementations, the input/output device 840 includes a display unit for displaying graphical user interfaces. According to some example embodiments, the input/output device 840 can provide input/output operations for a network device. For example, the input/output device 840 can include Ethernet ports or other networking ports to communicate with one or more wired and/or wireless networks (e.g., a local area network (LAN), a wide area network (WAN), the Internet, the cellular network, and/or the like).

In some example embodiments, the computing system 800 can be used to execute various interactive computer software applications that can be used for organization, analysis, and/or storage of data in various formats. Alternatively, the computing system 800 can be used to execute any type of software applications. These applications can be used to perform various functionalities, such as planning functionalities (e.g., generating, managing, editing of spreadsheet documents, word processing documents, and/or any other objects, etc.), computing functionalities, communications functionalities, etc. The applications can include various add-in functionalities (e.g., SAP Co-Pilot, SAP Integrated Business Planning as an add-in for a spreadsheet and/or other type of program) or can be standalone computing products and/or functionalities. Upon activation within the applications, the functionalities can be used to generate the user interface provided via the input/output device 840. The user interface can be generated and presented to a user by the computing system 800 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the following, further features and characteristics of the subject matter disclosed herein will be described by the following items.

Item 1: A system comprising: at least one data processor; and at least one memory storing instructions which, when executed by the at least one data processor, causes the system to at least: determine, for a received document including at least one item, that the received document likely includes at least one missing item, the determination based on at least a machine learning model and the at least one item; and provide an indication of the at least one missing item.

Item 2: The system of item 1, wherein the received document comprises an invoice, and wherein the at least one item includes a hospital billing code.

Item 3: The system of item 1 or 2, wherein the machine-learning model comprises a co-occurrence model.

Item 4: The system of item 3, wherein the co-occurrence model comprises a matrix including a value representative of a likelihood that pairs of items are likely to be included in the received document, the pairs of items including the at least one item and the at least one missing item.

Item 5: The system of item 3, wherein the co-occurrence model comprises a co-occurrence matrix including a value representative of a likelihood that pairs of items are likely to be included in the received document.

Item 6: The system of any of items 1-5, wherein the system is further caused to at least: provide a recommendation item corresponding to the at least one missing item.

Item 7: The system of any of items 1-6, wherein the system is further caused to at least: provide a value indicative of a confidence that the at least one missing item is missing from the received document.

Item 8: The system of any of items 1-7, wherein the system is further caused to at least: provide a value indicative of a confidence that the at least one missing item is missing from the received document.

Item 9: The system of any of items 1-8, wherein the system is further caused to at least: train, based on at least a set of reference documents, the machine-learning model, the set of reference documents each including a set of verified items.

Item 10: The system of any of items 1-9, wherein the machine-learning model is generated based on at least a statistical technique, a neural network, a pattern recognizer, a clustering algorithm, a rule-based engine, a priori information, a convolutional neural network, and/or a recurrent neural network, wherein the machine-learning model is generated based on at least an observed relations table, and/or wherein the machine learning model is normalized to a percentage value.

Item 11: A method comprising: determining, for a received document including at least one item, that the received document likely includes at least one missing item, the determination based on at least a machine learning model and the at least one item; and providing an indication of the at least one missing item.

Item 12: The method of item 11, wherein the received document comprises an invoice, and wherein the at least one item includes a hospital billing code.

Item 13: The method of items 11 or 12, wherein the machine-learning model comprises a co-occurrence model.

Item 14: The method of item 13, wherein the co-occurrence model comprises a matrix including a value representative of a likelihood that pairs of items are likely to be included in the received document, the pairs of items including the at least one item and the at least one missing item.

Item 15: The method of item 13, wherein the co-occurrence model comprises a co-occurrence matrix including a value representative of a likelihood that pairs of items are likely to be included in the received document.

Item 16: The method of any of items 11-15 further comprising: providing a recommendation item corresponding to the at least one missing item and/or a value indicative of a confidence that the at least one missing item is missing from the received document.

Item 17: The method of any of items 11-16 further comprising: training, based on at least a set of reference documents, the machine-learning model, the set of reference documents each including a set of verified items.

Item 18: The method of any of items 11-17, wherein the machine-learning model is generated based on at least a statistical technique, a neural network, a pattern recognizer, a clustering algorithm, a rule-based engine, a priori information, a convolutional neural network, and/or a recurrent neural network, wherein the machine-learning model is generated based on at least an observed relations table, and/or wherein the machine learning model is normalized to a percentage value.

Item 19: A non-transitory computer-readable storage medium including program code which when executed causes operations comprising: determining, for a received document including at least one item, that the received document likely includes at least one missing item, the determination based on at least a machine learning model and the at least one item; and providing an indication of the at least one missing item.

Item 20: The non-transitory computer-readable storage medium of item 19 19, wherein the received document comprises an invoice, and wherein the at least one item includes a hospital billing code.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system comprising:
   at least one data processor; and
   at least one memory storing instructions which, when executed by the at least one data processor, causes the system to at least:
   train, using at least a set of reference documents, a machine-learning model comprising a co-occurrence model, the set of reference documents each including a set of items verified to confirm the corresponding set of items is complete and is not missing any items, the set of items corresponding to hospital billing codes, and wherein the trained machine learning model comprising the co-occurrence model is trained to detect one or more missing hospital billing codes;
   receive a document comprising at least a first hospital billing code;
   determine, for the received document including the first hospital billing code, that the received document is missing at least a second hospital billing code, the determination based on at least the trained machine learning model and at least the first hospital billing code provided as an input to the trained machine learning model, the trained machine-learning model comprising the co-occurrence model providing a likelihood that the second hospital billing code is missing from the received document that includes the first hospital billing code, the co-occurrence model comprising a matrix including values representative of likelihoods that pairs of hospital billing codes are likely to be included in the received document, the pairs including the first hospital billing code and the missing second hospital billing code; and
   provide an indication of at least the missing second hospital billing code, wherein the indication comprises a recommendation to add the missing second hospital billing code to the received document.

2. The system of claim 1, wherein the system is further caused to at least:
   provide the likelihood as a confidence value that the second hospital billing code is missing from the received document.

3. The system of claim 2, wherein the system is further caused to at least:
provide the likelihood as a score.

4. A method comprising:
training, using at least a set of reference documents, a machine-learning model comprising a co-occurrence model, the set of reference documents each including a set of items verified to confirm the corresponding set of items is complete and is not missing any items, the set of items corresponding to hospital billing codes, and wherein the trained machine learning model comprising the co-occurrence model is trained to detect one or more missing hospital billing codes;
receiving a document comprising at least a first hospital billing code;
determining, for the received document including the first hospital billing code, that the received document is missing at least a second hospital billing code, the determination based on at least the trained machine learning model and at least the first hospital billing code provided as an input to the trained machine learning model, the trained machine-learning model comprising the co-occurrence model providing a likelihood that the second hospital billing code is missing from the received document that includes the first hospital billing code, the co-occurrence model comprising a matrix including values representative of likelihoods that pairs of hospital billing codes are likely to be included in the received document, the pairs including the first hospital billing code and the missing second hospital billing code; and
providing an indication of at least the missing second hospital billing code, wherein the indication comprises a recommendation to add the missing second hospital billing code to the received document.

5. The method of claim 4, further comprising providing the likelihood as a confidence value that the second hospital billing code is missing from the received document.

6. The method of claim 4, wherein the likelihood is provided as a score.

7. A non-transitory computer-readable storage medium including program code which when executed causes operations comprising:
training, using at least a set of reference documents, a machine-learning model comprising a co-occurrence model, the set of reference documents each including a set of items verified to confirm the corresponding set of items is complete and is not missing any items, the set of items corresponding to hospital billing codes, and wherein the trained machine learning model comprising the co-occurrence model is trained to detect one or more missing hospital billing codes;
receiving a document comprising at least a first hospital billing code;
determining, for the received document including the first hospital billing code, that the received document is missing at least a second hospital billing code, the determination based on at least the trained machine learning model and at least the first hospital billing code provided as an input to the trained machine learning model, the trained machine-learning model comprising the co-occurrence model providing a likelihood that the second hospital billing code is missing from the received document that includes the first hospital billing code, the co-occurrence model comprising a matrix including values representative of likelihoods that pairs of hospital billing codes are likely to be included in the received document, the pairs including the first hospital billing code and the missing second hospital billing code; and
providing an indication of at least the missing second hospital billing code, wherein the indication comprises a recommendation to add the missing second hospital billing code to the received document.

* * * * *